(12) United States Patent
Nishido et al.

(10) Patent No.: US 11,692,535 B2
(45) Date of Patent: Jul. 4, 2023

(54) AIR COMPRESSOR

(71) Applicant: MAKITA CORPORATION, Anjo (JP)

(72) Inventors: Noriyuki Nishido, Anjo (JP); Yasuhiro Morioka, Anjo (JP)

(73) Assignee: MAKITA CORPORATION, Anjo (JP)

( * ) Notice: Subject to any disclaimer, the term of this patent is extended or adjusted under 35 U.S.C. 154(b) by 169 days.

(21) Appl. No.: 17/353,907

(22) Filed: Jun. 22, 2021

(65) Prior Publication Data

US 2022/0042501 A1 Feb. 10, 2022

(30) Foreign Application Priority Data

Aug. 6, 2020 (JP) ................................. 2020-133681

(51) Int. Cl.
| | |
|---|---|
| *F04B 35/04* | (2006.01) |
| *F04B 41/02* | (2006.01) |
| *F04B 39/16* | (2006.01) |
| *F04B 39/12* | (2006.01) |
| *H01M 50/207* | (2021.01) |
| *H01M 50/247* | (2021.01) |

(52) U.S. Cl.
CPC ............ *F04B 35/04* (2013.01); *F04B 39/121* (2013.01); *F04B 39/16* (2013.01); *F04B 41/02* (2013.01); *H01M 50/207* (2021.01); *H01M 50/247* (2021.01); *H01M 2220/30* (2013.01)

(58) Field of Classification Search
CPC ........ F04B 35/04; F04B 39/12; F04B 39/121; F04B 39/16; F04B 41/02; F04B 39/14; H01M 50/247
See application file for complete search history.

(56) References Cited

U.S. PATENT DOCUMENTS

| | | | | |
|---|---|---|---|---|
| 6,095,762 A | * | 8/2000 | Wheeler | ................ F04B 35/04 417/275 |
| 2006/0067836 A1 | * | 3/2006 | Smith | .................... F04B 41/02 417/234 |

(Continued)

FOREIGN PATENT DOCUMENTS

| | | | | |
|---|---|---|---|---|
| JP | 2020033969 | * | 3/2020 | ............. F04B 41/02 |
| WO | WO-2009014069 A1 | * | 1/2009 | ............. F04B 41/02 |

OTHER PUBLICATIONS

WO2009014069 translation (Year: 2023).*
JP2020033969 translation (Year: 2023).*

*Primary Examiner* — Kenneth J Hansen
*Assistant Examiner* — David N Brandt
(74) *Attorney, Agent, or Firm* — Oliff PLC

(57) ABSTRACT

An air compressor more reliably protects a battery pack without lowering its operability for attachment to and detachment from a battery mount. The air compressor includes an electric motor driven on power from a battery pack having six faces, an operation unit operable to connect or disconnect power to the electric motor, an compression unit driven by the electric motor to produce compressed air, a tank that stores the compressed air, a battery mount that receives an attachment face of the battery pack, and a guard defining a protective area to contain the battery pack and the compression unit. The battery pack is attachable to the battery mount with at least three of the six faces exposed.

11 Claims, 12 Drawing Sheets

(56) References Cited

U.S. PATENT DOCUMENTS

| 2006/0104836 A1* | 5/2006 | Phillips | F04B 41/02 |
| | | | 417/410.1 |
| 2018/0198303 A1* | 7/2018 | Yang | H02J 7/00 |
| 2020/0056602 A1* | 2/2020 | Westling | F04B 39/123 |

* cited by examiner

AIR COMPRESSOR

CROSS-REFERENCE TO RELATED APPLICATIONS

This application claims the benefit of priority to Japanese Patent Application No. 2020-133681, filed on Aug. 6, 2020, the entire contents of which are hereby incorporated by reference.

BACKGROUND

1. Technical Field

The present disclosure relates to an air compressor, for example, a relatively small, highly portable air compressor. A small compressor is used to supply compressed air to a compressed air-driven nailer or an air tool such as an air duster.

2. Description of the Background

A portable air compressor, which has a smaller discharge capacity than a large, stationary air compressor, is relatively small and can be carried easily. A portable air compressor is thus highly convenient for light work using an air tool.

A known portable air compressor is described in U.S. Patent Application Publication No. 2020/0056602. The portable air compressor includes a compression unit that produces compressed air, a storage tank that stores the produced compressed air, and an operation unit operable to activate or deactivate the portable air compressor or to control the pressure settings. The compression unit includes an electric motor as a drive. A rechargeable battery pack is used as a power supply. The compression unit is a reciprocating unit that converts the rotational output from the electric motor and reciprocates a piston in a cylinder to discharge compressed air. The compressed air discharged from the compression unit is stored into the storage tank and then is supplied to an air tool.

The known air compressor includes a guard mainly surrounding the compression unit and the operation unit. The guard protects the components from operational malfunction or damage that may occur when, for example, the air compressor accidentally hits a wall during transport or contacts a handheld tool during placement.

BRIEF SUMMARY

However, the known air compressor may be improved variously. For example, the guard can lower the operability of the battery pack for attachment and detachment.

One or more aspects of the present disclosure are directed to an air compressor that more reliably protects a battery pack without lowering its operability for attachment to and detachment from a battery mount.

A first aspect of the present disclosure provides an air compressor, including:
an electric motor driven on power from a battery pack having six faces;
an operation unit operable to connect or disconnect power to the electric motor;
an compression unit driven by the electric motor to produce compressed air;
a tank configured to store the compressed air;
a battery mount configured to receive an attachment face of the battery pack; and
a guard defining a protective area to contain the battery pack and the compression unit, the battery pack being attachable to the battery mount with at least three of the six faces exposed.

DETAILED DESCRIPTION

Embodiments of the present disclosure will be described with reference to FIGS. 1 to 12. An air compressor 1 according to an embodiment is relatively small and highly portable. The air compressor 1 supplies compressed air as a drive source to a compressed air-driven nailer or an air tool such as an air tacker. The air compressor 1 is typically placed on the floor or a work table (placement surface F) at a construction site.

Figure 1:
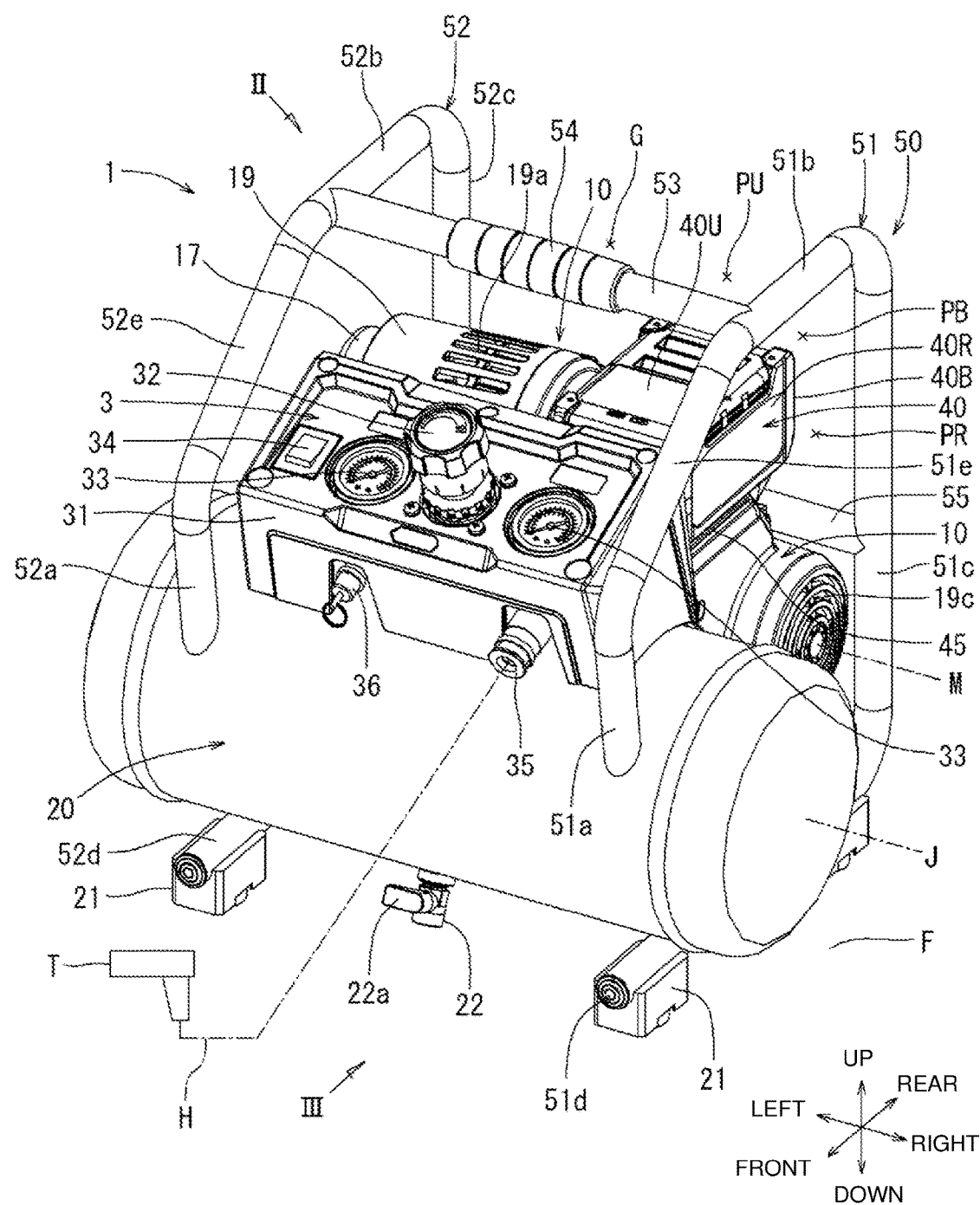
FIG. 1 is an overall perspective view of an air compressor according to an embodiment as viewed diagonally from the right front.
Figure 2:
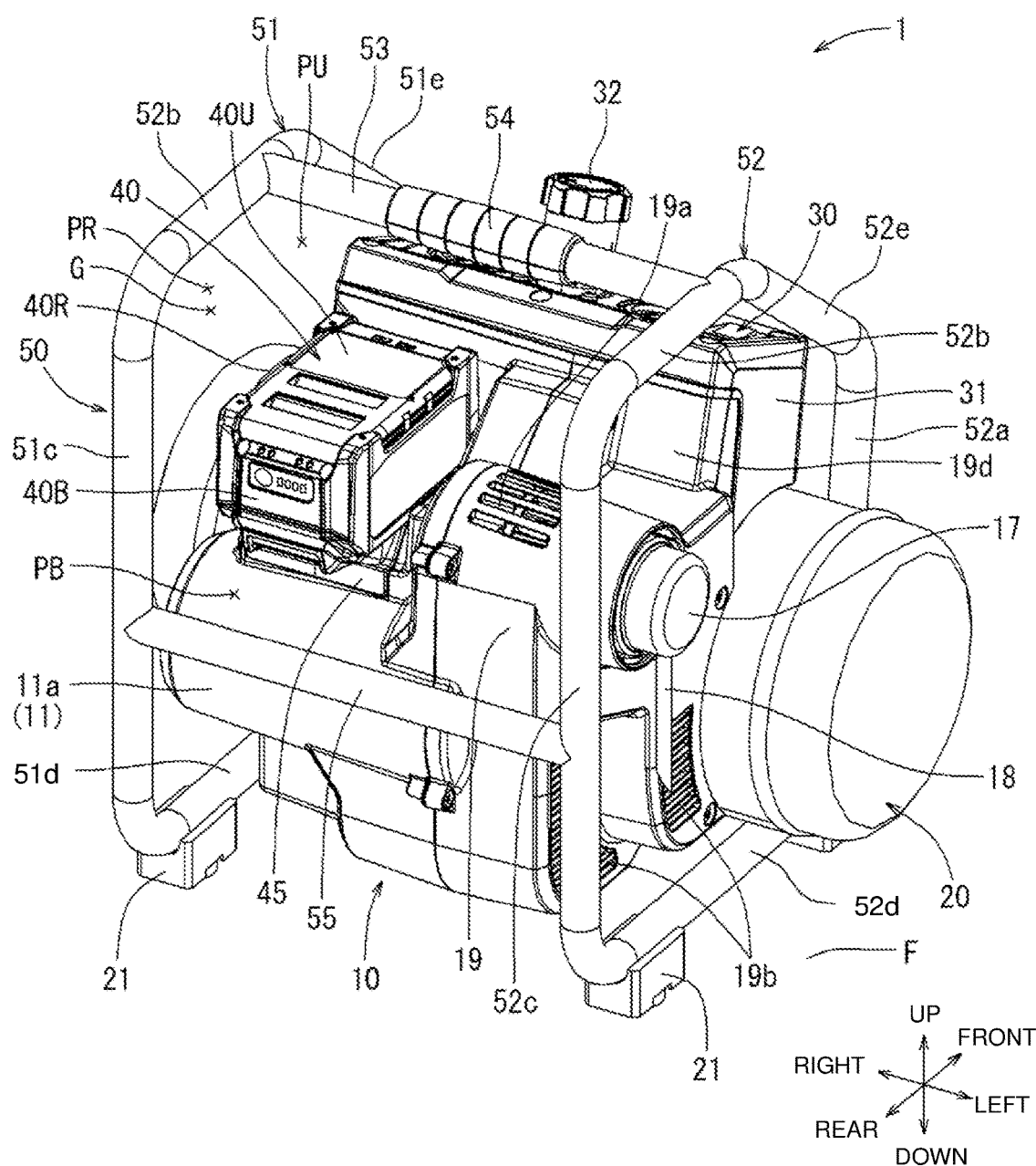
FIG. 2 is an overall perspective view of the air compressor according to the embodiment as viewed in the direction indicated by arrow II (diagonally from the left rear) in FIG. 1.
Figure 3:
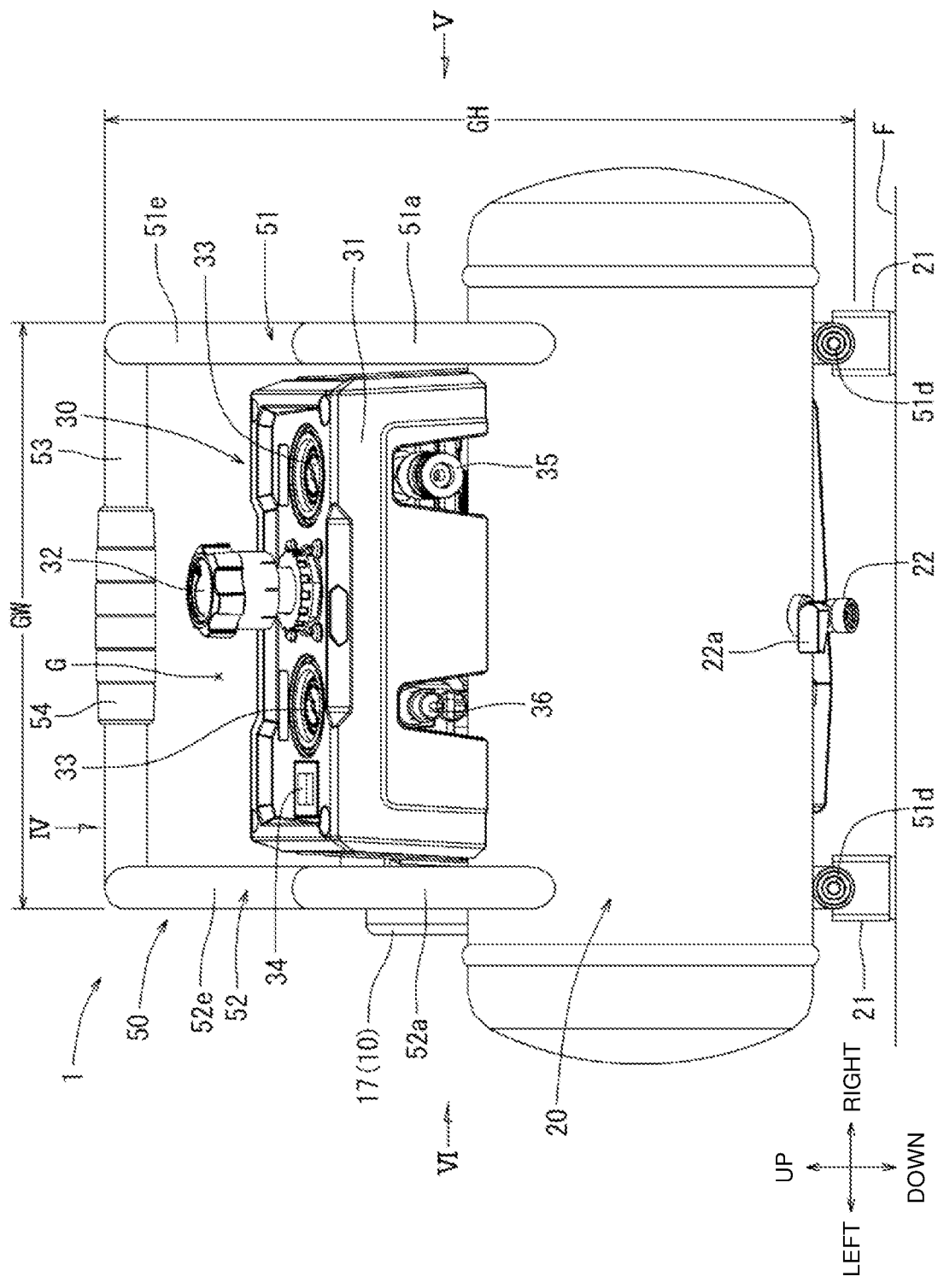
FIG. 3 is a front view of the air compressor as viewed in the direction indicated by arrow III in FIG. 1.
Figure 9:
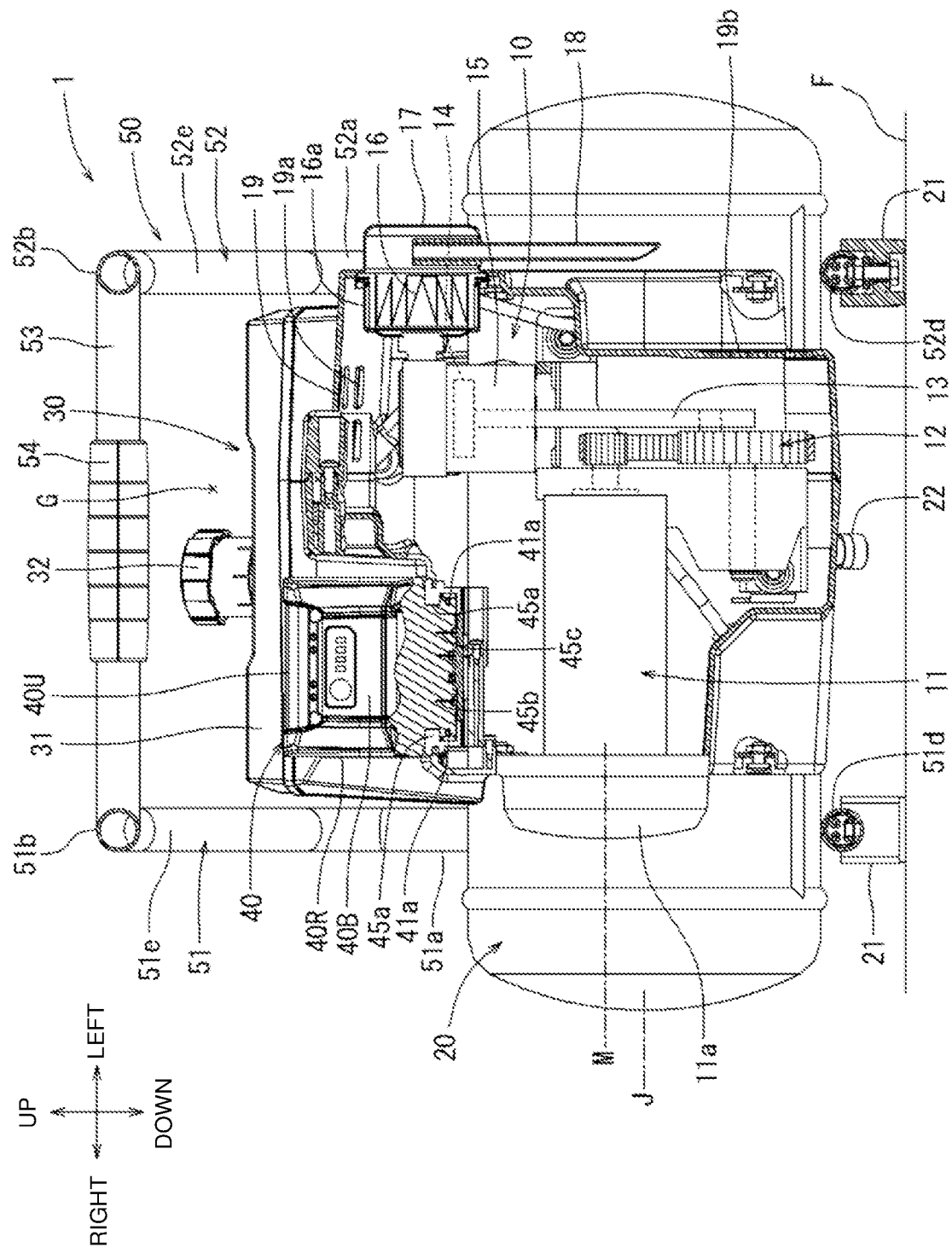
FIG. 9 is a cross-sectional view of a compression unit showing its internal structure as viewed from the rear.

As shown in FIGS. 1 to 7, the air compressor 1 includes a compression unit 10, a tank 20, and an operation unit 30. The compression unit 10 draws outside air to produce compressed air. The tank 20 stores the compressed air. The operation unit 30 is operable to activate or deactivate the compression unit 10. As shown in FIG. 9, the compression unit 10 includes an electric motor 11 as its driving source. The electric motor 11 is a direct-current (DC) brushless motor including a cylindrical motor housing 11a accommodating a stator and a rotor. As shown in FIG. 2, the motor housing 11a is integral with a compression unit cover 19 that substantially covers the entire compression unit 10. The electric motor 11 is activated on power from a battery pack 40 (described later).

The rotational output from the electric motor 11 is transmitted to a piston rod 13 through a belt transmission 12. The piston rod 13 moves up and down to cause a piston 14 to reciprocate vertically in a cylinder 15. The cylinder 15 receives, at its end where outside air is drawn, a filter 16 for filtering outside air. The filter 16 is accommodated in a cylindrical compartment 16a. The compartment 16a is covered with a circular lid 17. The lid 17 is connected with an intake pipe 18 for drawing outside air. Under negative pressure in the cylinder 15, outside air is drawn into the cylinder 15 through the intake pipe 18. The lid 17 is rotated by a predetermined angle and removed to allow removal of the filter 16 from the compartment 16a for cleaning or replacement.

Figure 4:
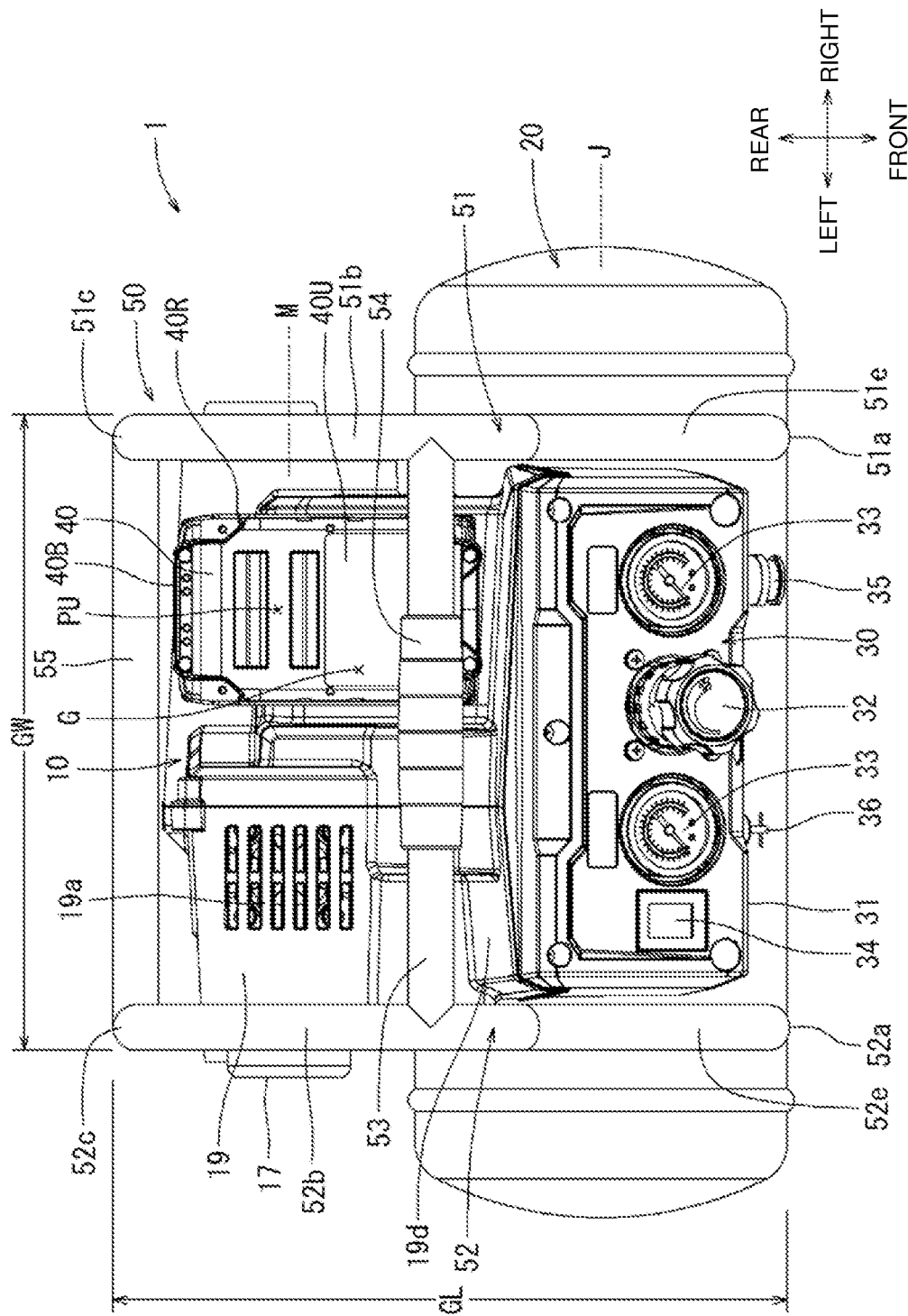
FIG. 4 is a top view of the air compressor as viewed in the direction indicated by arrow IV in FIG. 3.
Figure 5:
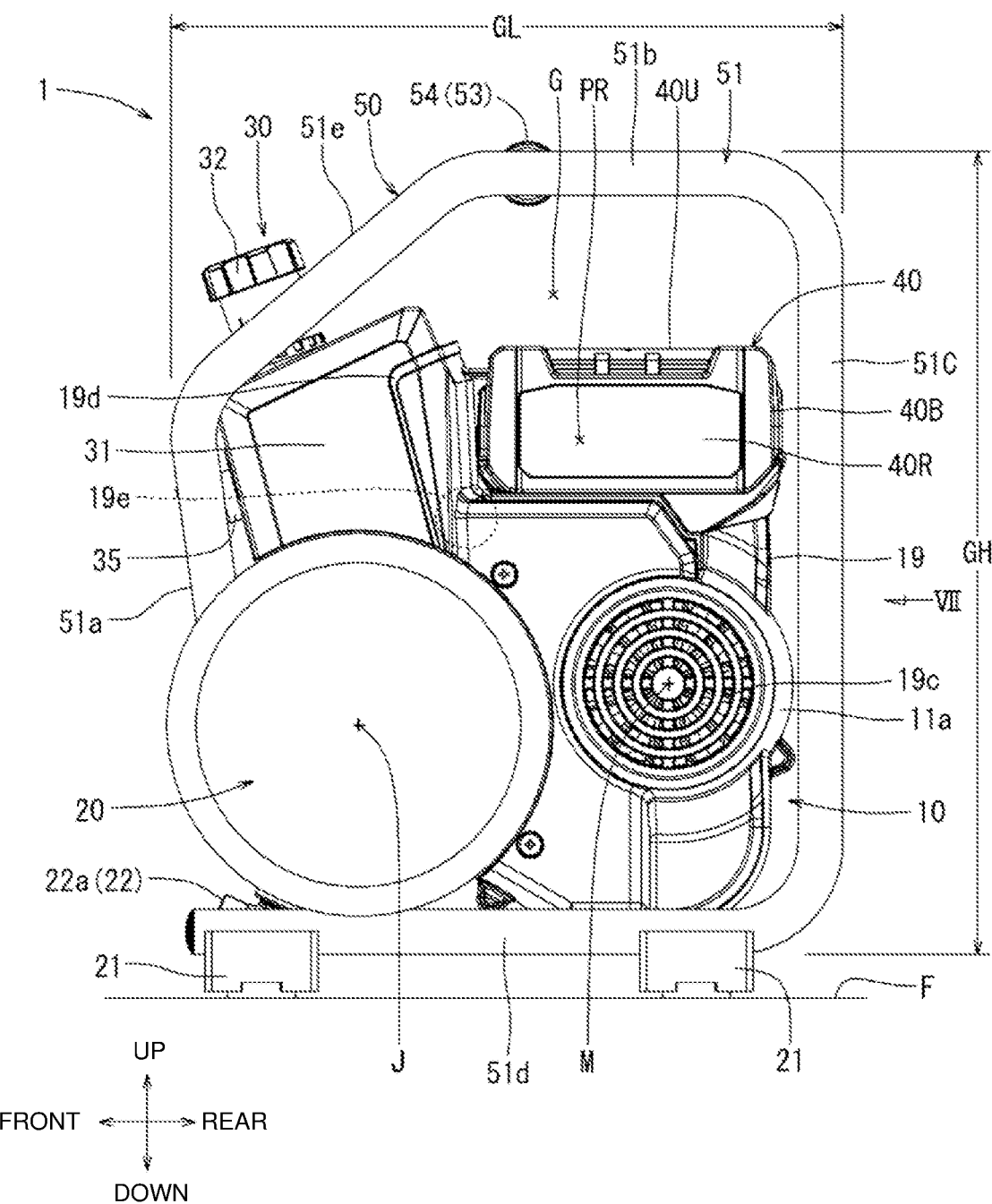
FIG. 5 is a right side view of the air compressor as viewed in the direction indicated by arrow V in FIG. 3.
Figure 6:
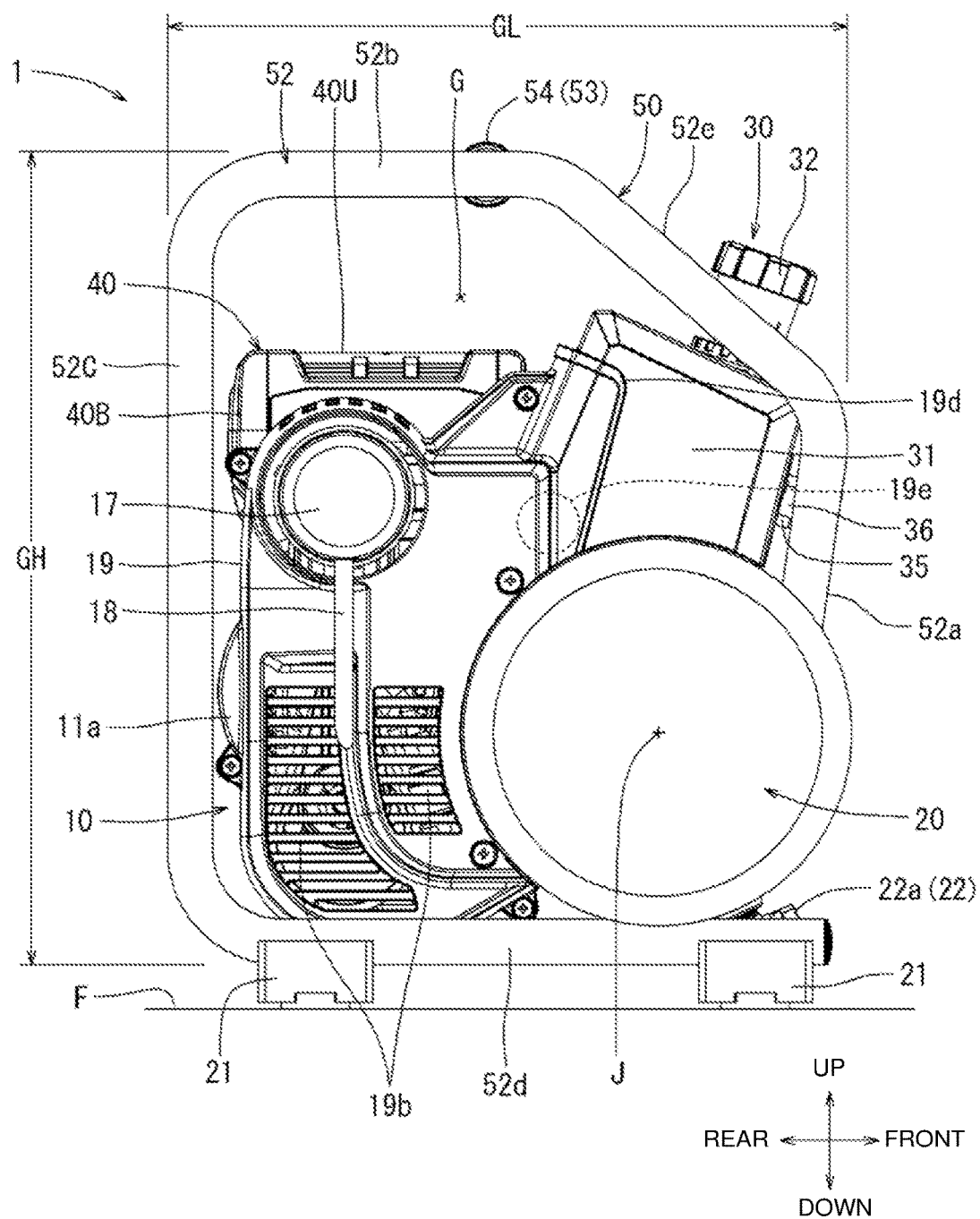
FIG. 6 is a left side view of the air compressor as viewed in the direction indicated by arrow VI in FIG. 3.
Figure 7:
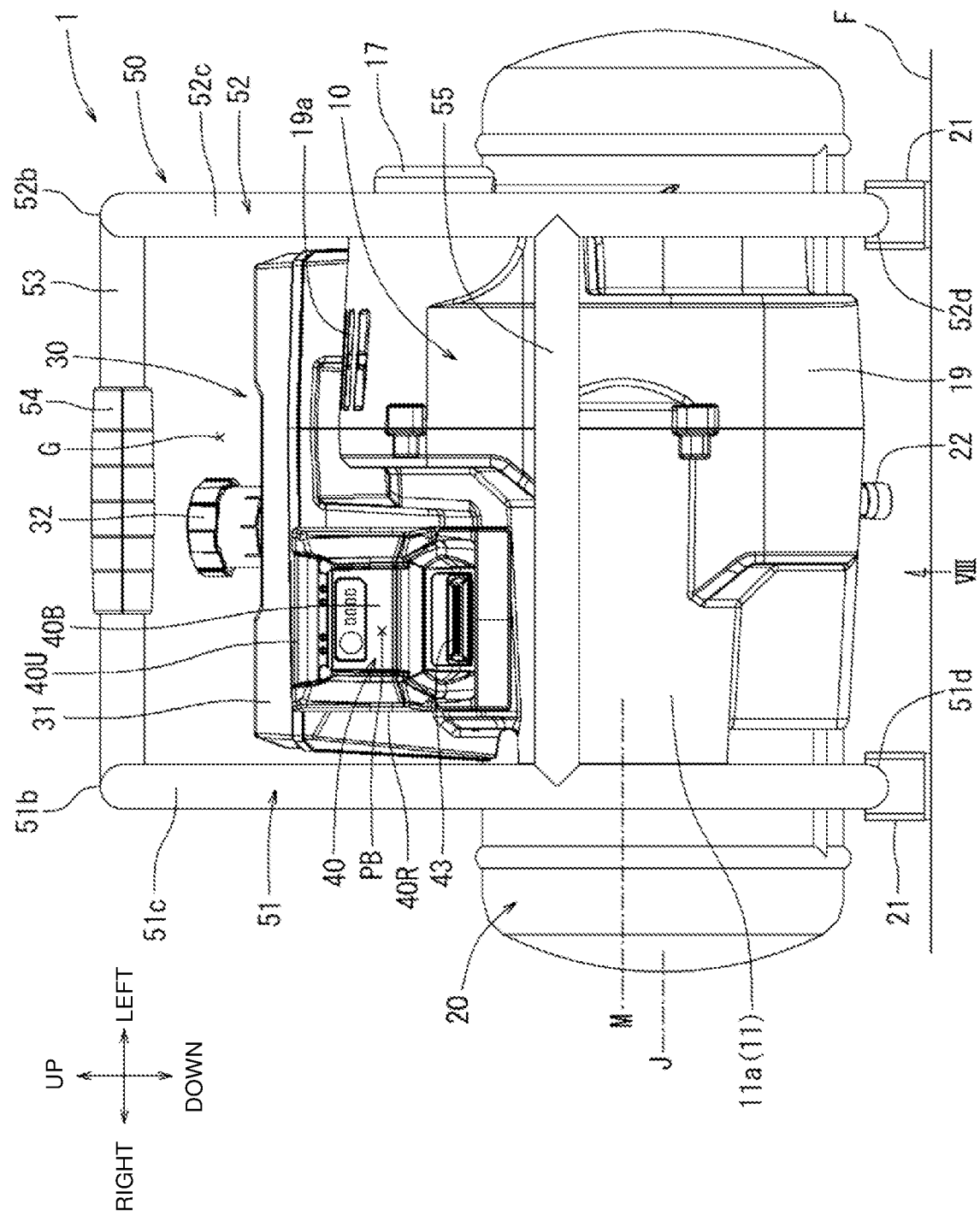
FIG. 7 is a rear view of the air compressor as viewed in the direction indicated by arrow VII in FIG. 5.
Figure 8:
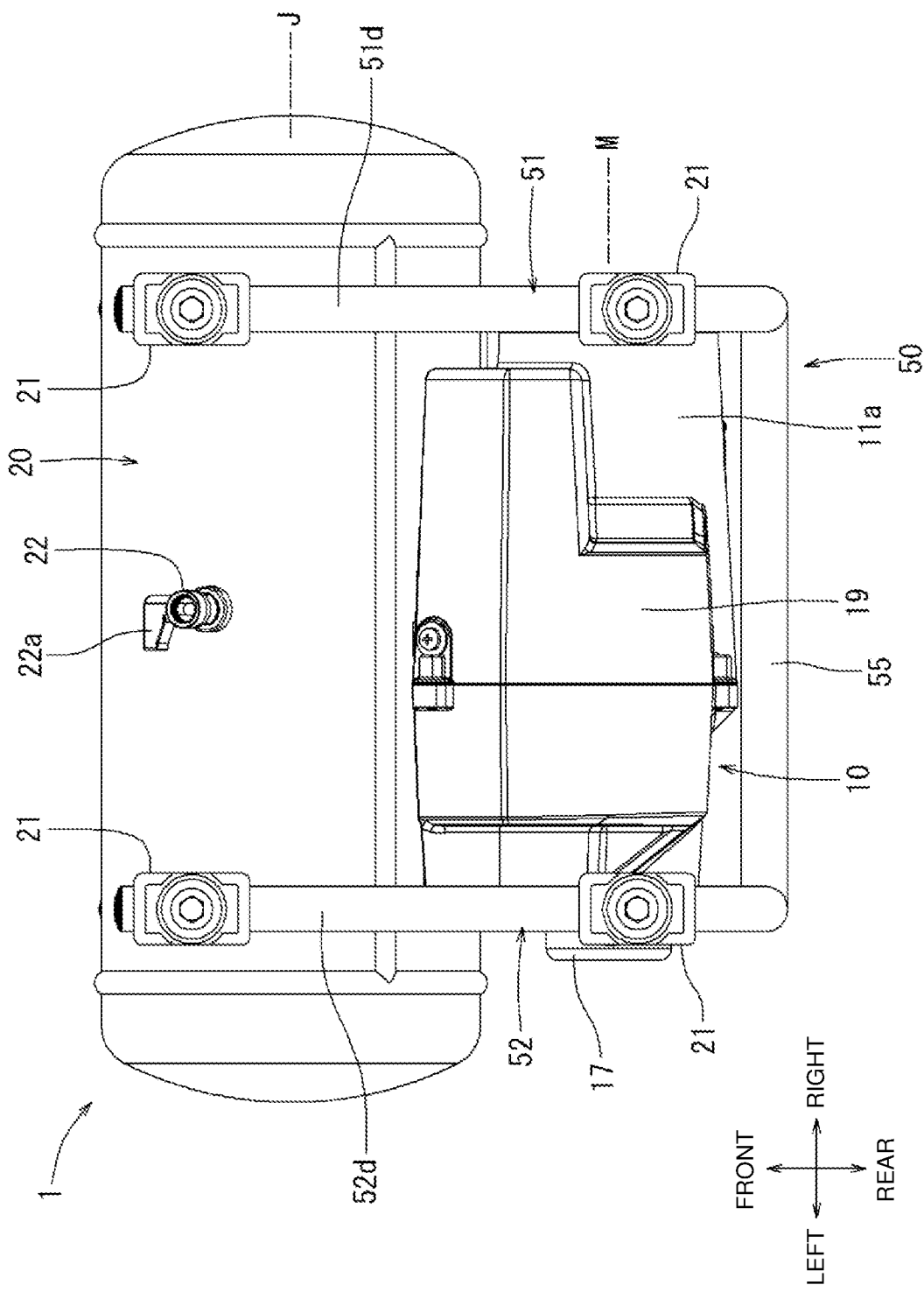
FIG. 8 is a bottom view of the air compressor as viewed in the direction indicated by arrow VIII in FIG. 7.

The compression unit 10, including the electric motor 11, is covered entirely with the compression unit cover 19. The compression unit cover 19 is formed from a resin. As shown in FIGS. 1, 2, and 4, the compression unit cover 19 has multiple heat vents 19a for releasing heat in its upper surface above the cylinder 15. The air cooling the cylinder 15 and its surrounding area is released through the heat vents 19a. The compression unit cover 19 has multiple outlets 19b in a lower portion of its left side surface. As shown in FIGS. 1 and 5, the compression unit cover 19 has multiple inlets 19c in its right side surface, which is also the right end face of the motor housing 11a. As a cooling fan included in the electric motor 11 rotates, outside air is drawn into the compression unit cover 19 through the inlets 19c. The outside air drawn in and flowing leftward then cools the electric motor 11. The drawn outside air (motor cooling air) is released from the compression unit cover 19 through the heat vents 19a and the outlets 19b.

As shown in FIGS. 2, 4, 5, and 6, the compression unit cover 19 has a front portion 19d covering the rear surface of the operation unit 30 (described later). The front portion 19d of the compression unit cover 19 covers a clearance between the compression unit 10 and the tank 20 from above. As shown in FIG. 5, electric wiring and air tubing (tubing 19e) are routed through the clearance between the compression unit 10 and the tank 20. In particular, the front portion 19d of the compression unit cover 19 covers the tubing 19e from above. The tubing 19e is thus routed through unused space between the compression unit 10 and the tank 20 to improve space efficiency, and is protected against any interference with other components or accumulation of dust or other matter.

In response to activation of the electric motor 11, the compression unit 10 is actuated to produce compressed air. The compressed air produced in the compression unit 10 is stored into the tank 20 through the air tubing. The tank 20 is cylindrical and has two ends sealed hermetically. The tank 20 is elongated (along a tank axis J) in the lateral direction. The tank 20 is located in a lower front portion of the air compressor 1 and in front of the electric motor 11. As shown in FIGS. 1, 4, and 5, the electric motor 11 has a motor axis M extending in the lateral direction. In other words, the tank axis J and the motor axis M are substantially parallel to each other. In addition, the tank 20 and the electric motor 11 are adjacent to each other in the front-rear direction.

As shown in FIGS. 3, 5, 6, and 7, the tank 20 is placed with a clearance from the placement surface F with four legs 21 on a guard 50 (described later). The tank 20 includes a drain 22 for draining water on its lower surface. The clearance between the tank 20 and the placement surface F left with the four legs 21 allows a user to easily operate an open-close cock 22a of the drain 22.

The operation unit 30 is located above the tank 20. The operation unit 30 mainly includes a rectangular flat plate serving as an operation panel. The operation unit 30 is accommodated in an operation unit case 31. The operation unit 30 has an operation surface (operation panel) inclined upward toward the front. This improves the viewability of the operation unit 30 diagonally from the upper front. The operation unit 30 includes, at its middle portion, an adjustment dial 32 for adjusting the pressure settings. The operation unit 30 includes two pressure gauges 33 arranged on either side of the adjustment dial 32. One pressure gauge 33 indicates the pressure set by operating the adjustment dial 32. The other pressure gauge 33 indicates the supply pressure in the tank 20.

The operation unit 30 includes an activation switch 34 on the left end. The activation switch 34 is a rocker switch. The activation switch 34 is operable to activate or deactivate the compression unit 10. In response to the activation switch 34 being turned on, the electric motor 11 is activated to start producing compressed air. In response to the activation switch 34 being turned off, the electric motor 11 is deactivated to stop producing compressed air.

When the air pressure in the tank 20 reaches the set pressure during operation, a pressure sensor detects the pressure and causes the electric motor 11 to stop. The compression unit 10 then enters a standby state.

The operation unit 30 includes, on its lower front, a connection port 35, which receives an air tool, and a relief valve 36. The connection port 35 is a quick-connect coupler. As shown in FIG. 1, an air hose H connected to the connection port 35 allows the compressed air in the tank 20 to be supplied to an air tool T through it. An operation on the relief valve 36 forces the compressed air in the tank 20 to be released to the atmosphere.

Figure 10:
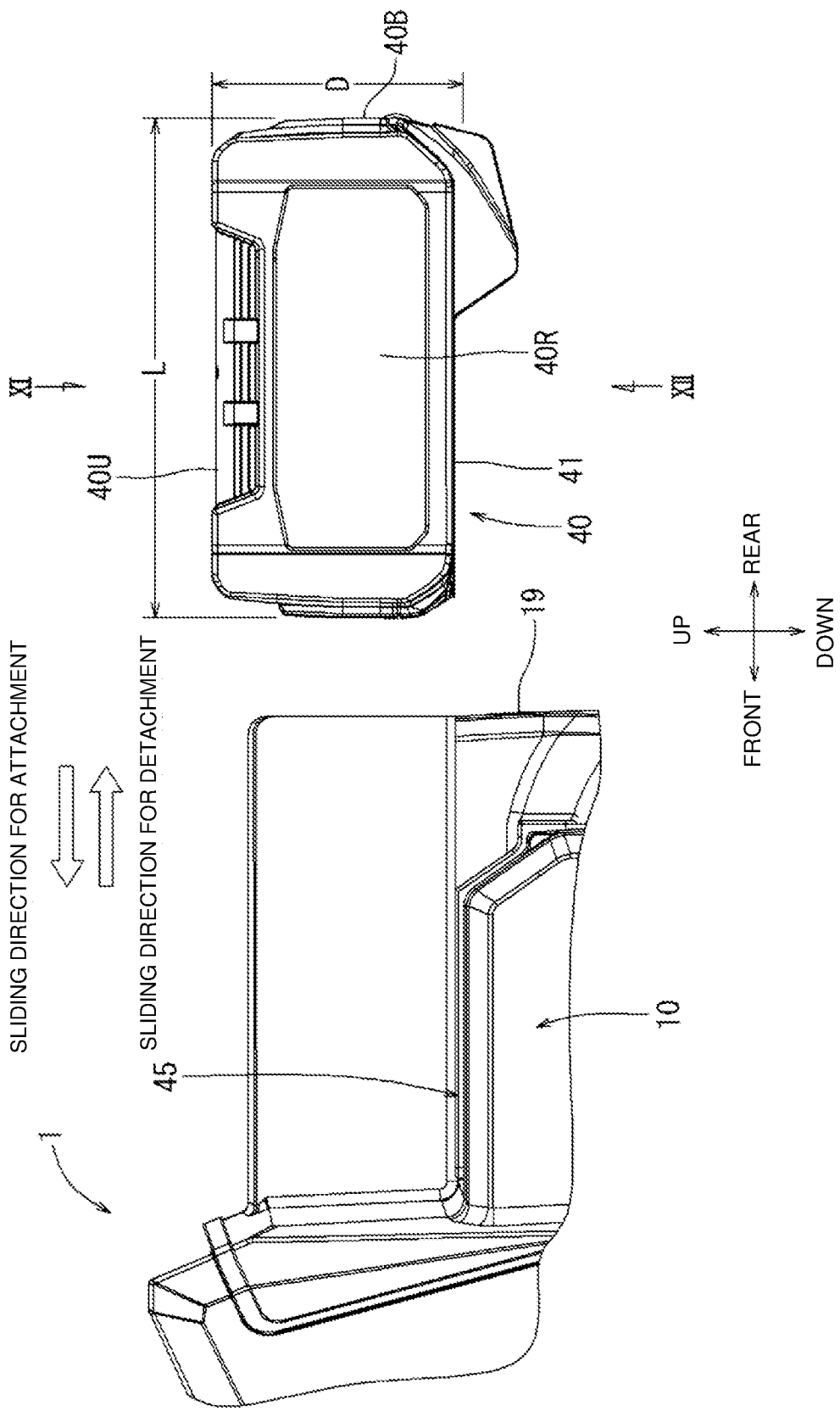
FIG. 10 is a right side view of a battery mount with a battery pack detached rearward.

As shown in FIGS. 1, 2, 4, 5, and 7, the compression unit cover 19 includes a battery mount 45 on its upper surface. The battery mount 45 is behind the operation unit 30 and receives a battery pack 40. As shown in FIG. 9, the battery mount 45 is located on the right of the cylinder 15 in the compression unit 10 and above the electric motor 11. The battery pack 40 and battery mount 45 are shown in FIGS. 10 to 12 in detail.

The battery pack 40 is a substantially rectangular block (hexahedron) having six faces. The battery pack 40 has a length L, a width W, and a height D. The lower face of the battery pack 40 serves as an attachment face 41 attachable to the battery mount 45. As shown in FIGS. 11 and 12, the battery pack 40 is attachable to and detachable from the battery mount 45 by sliding the battery pack 40 on the battery mount 45 back and forth with the attachment face 41 facing downward. The battery pack 40 mounted on the battery mount 45 has its upper face 40U facing upward, right face 40R facing rightward, and rear face 40B facing rearward.

Figure 12:
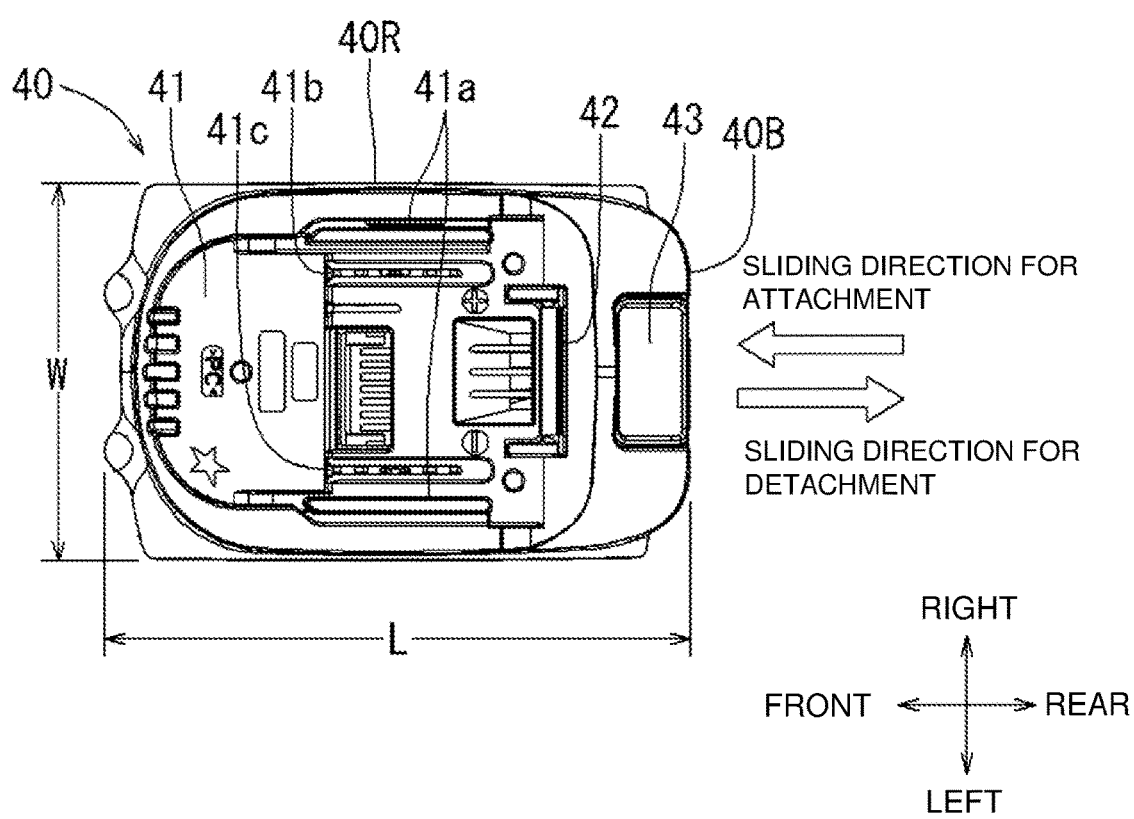
FIG. 12 is a bottom view of the battery pack as viewed in the direction indicated by arrow XII in FIG. 10.

As shown in FIG. 12, the battery pack 40 includes a pair of right and left rails 41a on the attachment face 41. A positive terminal receiver 41b and a negative terminal receiver 41c are located between the right and left rails 41a. The attachment face 41 includes a lock tab 42 at the rear. The lock tab 42 is engaged with the battery mount 45. An unlock button 43 is located behind the lock tab 42. The unlock button 43 moves the lock tab 42 to an unlock position. Pressing the unlock button 43 upward causes the lock tab 42 to retract upward, disengaging the lock tab 42 from the battery mount 45.

Figure 11:
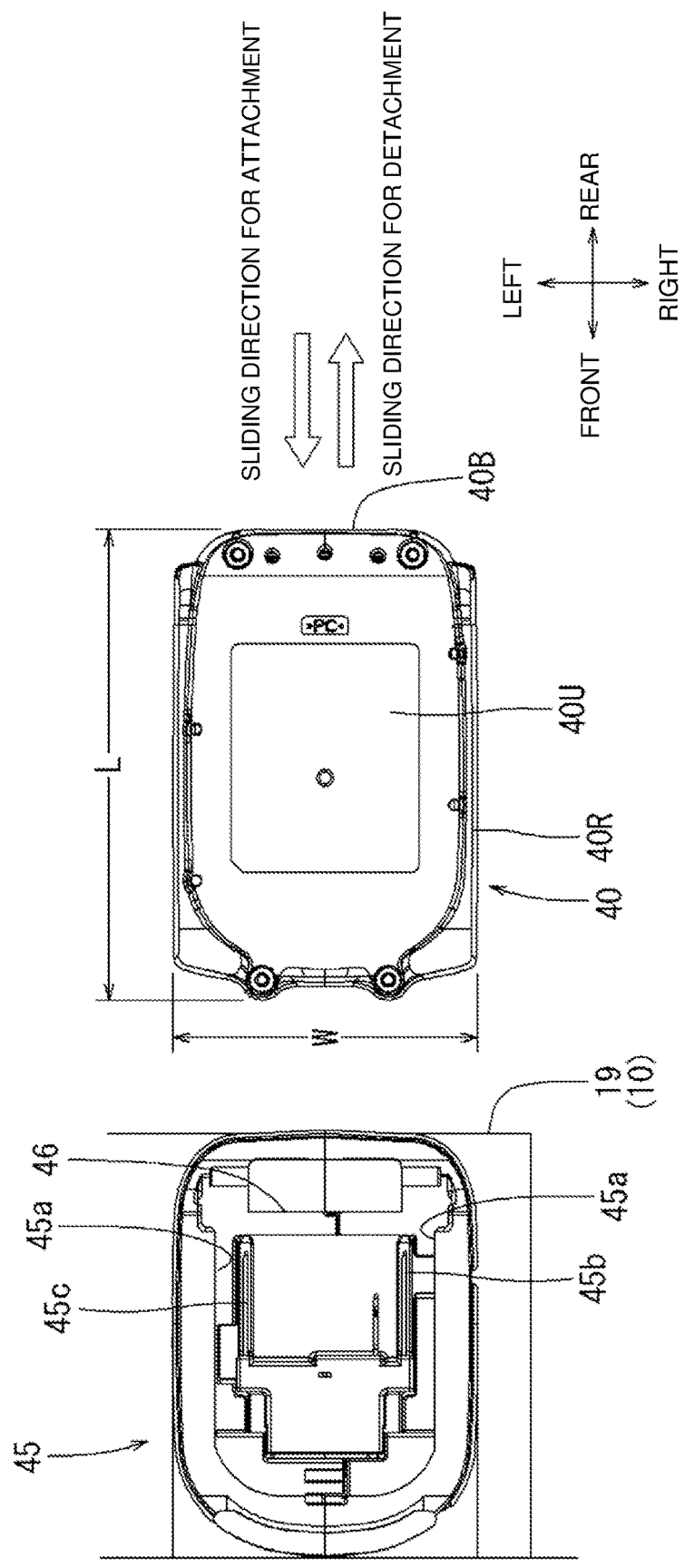
FIG. 11 is a top view of the battery mount with the battery pack detached rearward as viewed in the direction indicated by arrow XI in FIG. 10.

As shown in FIG. 11, the battery mount 45 includes a pair of right and left rail receivers 45a. The battery pack 40 is slidable back and forth on the battery mount 45 with the rails 41a guided along the rail receivers 45a. A positive terminal 45b and a negative terminal 45c are located between the right and left rail receivers 45a. The battery mount 45 has a lock recess 46 at the rear. The lock recess 46 is engaged with the lock tab 42 on the battery pack 40.

To detach the battery pack 40 from the battery mount 45, the battery pack 40 is slid backward with the unlock button 43 being pressed upward. The detached battery pack 40 may be used for another power tool as a power supply or charged with a separate charger for repeated use.

To attach the battery pack 40 to the battery mount 45, the battery pack 40 is slid forward with the rails 41a engaged along the rail receivers 45a. This allows the battery pack 40 to power the electric motor 11 and other electrical components including the pressure sensor.

As shown in FIG. 5, the battery mount 45 is located to receive the battery pack 40 with its front above the tank 20. The front of the battery pack 40 thus overlaps the tank 20 in the front-rear direction when attached. This reduces the mount space for the battery pack 40 in the front-rear direction.

The air compressor 1 according to the present embodiment includes the guard 50. The guard 50 substantially covers the entire of the compression unit 10, the tank 20, and the operation unit 30. The guard 50 includes a right frame 51 and a left frame 52. The right frame 51 is located in a right portion of the air compressor 1, and the left frame 52 is located in a left portion of the air compressor 1. The right frame 51 and the left frame 52 are arranged symmetrically to each other. The right frame 51 and the left frame 52 are connected each other with a connecting frame 53 extending in the lateral direction. The connecting frame 53 includes a handle 54.

The right frame 51 and the left frame 52 have the same frame shape and are at positions symmetrical to each other. The right frame 51 has a front frame 51a at the front, an upper frame 51b at the top, a rear frame 51c at the rear, and a lower frame 51d at the bottom. The left frame 52 has a front frame 52a at the front, an upper frame 52b at the top, a rear frame 52c at the rear, and a lower frame 52d at the bottom. The front frames 51a and 52a extend upward from front portions of the tank 20. The front frames 51a and 52a in the embodiment respectively have front inclines 51e and 52e, each having an upper end inclined diagonally rearward. The upper ends of the front inclines 51e and 52e receive the front ends of the upper frames 51b and 52b. The upper frames 51b and 52b extend rearward from the upper ends of the front inclines 51e and 52e. The rear frames 51c and 52c extend downward from the rear ends of the upper frames 51b and 52b. The lower frames 51d and 52d extend frontward from the lower ends of the rear frames 51c and 52c and are connected to the lower surface of the tank 20.

The right and left upper frames 51b and 52b are connected to each other with the connecting frame 53 at around the front. The connecting frame 53 has, in its longitudinal direction, a middle portion covered with a nonslip rubber layer, which defines the handle 54. The handle 54 is gripped by the user to carry the air compressor 1.

The right and left rear frames 51c and 52c are connected parallel to each other with a connecting frame 55. The right frame 51 and the left frame 52 each have one end connected to the front portion of the tank 20 and the other end connected to a lower portion of the tank 20. The right frame 51 and the left frame 52 are thus looped around the air compressor 1.

The front ends of the right and left lower frames 51d and 52d project frontward from the lower portions of the tank 20. The tank 20 is thus stably placed. The right and left lower frames 51d and 52d each receive the legs 21 at their front and rear. The legs 21 are formed from rubber. The air compressor 1 is placed on the placement surface F with the clearance left with the four legs 21. This enables reliable operation of the open-close cock 22a of the drain 22.

The right frame 51 and the left frame 52 define a protective area G between them. As shown in FIGS. 3 to 6, the protective area G is defined within a lateral area GW in the lateral direction, a vertical area GH in the vertical direction, and a front-rear area GL in the front-rear direction. The protective area G contains the compression unit 10, the tank 20, the operation unit 30, the battery mount 45, and the battery pack 40. This structure protects the components from any damage that may occur when, for example, the air compressor 1 has interference or collision with a wall or other component such as a handheld tool during transport or placement. The protective area G substantially contains the entire battery pack 40, in addition to the entire compression unit 10.

The lid 17, which is a part of the compression unit 10, protrudes leftward from the compression unit cover 19. The lid 17 has a portion protruding laterally further from the protective area G of the guard 50. The lid 17 thus has the peripheral surface wide enough for the user to firmly hold and rotate the lid 17.

The compression unit 10 is substantially entirely contained within the protective area G, except the lid 17. This structure avoids any interference of the compression unit 10 with other components, thus protecting the compression unit 10. The tank 20 is contained within the protective area G, except the right and left ends. The operation unit 30 is substantially entirely contained within the protective area G, except an upper portion of the adjustment dial 32. The upper portion of the adjustment dial 32 protruding upward from the protective area G improves the operability or grippability of the adjustment dial 32.

The battery mount 45 on the upper surface of the compression unit cover 19 and the battery pack 40 are entirely contained within the protective area G. The battery pack 40 has five faces, all except the attachment face 41, exposed to an open space. In particular, in the present embodiment as shown in FIGS. 1 and 2, the battery pack 40 has three faces, or specifically, an upper face 40U, a right face 40R, and a rear face 40B, exposed laterally widely.

The right frame 51 defines an opening PR that allows the right face 40R of the battery pack 40 to be exposed rightward. The upper frame 51b of the right frame 51 and the upper frame 52b of the left frame 52 define an opening PU that allows the upper face 40U of the battery pack 40 to be exposed upward. The rear frame 51c of the right frame 51 and the rear frame 52c of the left frame 52 define an opening PB that allows the rear face 40B of the battery pack 40 to be exposed rearward.

The battery pack 40 is contained within the protective area G of the guard 50. This structure protects the battery pack 40 and allows at least the three faces of the battery pack 40, or the right face 40R, the upper face 40U, and the rear face 40B, to be exposed laterally, upward, and rearward through the openings PR, PU, and PB of the guard 50. This structure provides space for the user to access, with fingers, at least the three faces of the battery pack 40 when attaching or detaching the battery pack 40. This facilitates handling and grasping of the battery pack 40 during attachment or detachment.

In the present embodiment, the battery pack 40 is mounted within the protective area G of the guard 50. This structure can thus avoid interference or collision of the battery pack 40 with other components, protecting the battery pack 40.

When attached to the battery mount 45, the battery pack 40 has three faces, or the upper face 40U, the right face 40R, and the rear face 40B, exposed widely outward through the openings PU, PR, and PB. This structure allows the user to easily access, with fingers, the three faces 40U, 40R, and 40B of the battery pack 40 to handle the battery pack 40. This enables reliable operation of the battery pack 40 for attachment and detachment.

The air compressor 1 according to the present embodiment includes the compression unit cover 19 that covers the compression unit 10, and the battery mount 45 on the upper surface of the compression unit cover 19. The battery pack 40 is thus attached to the upper surface of the compression unit cover 19 and is protected by the guard 50.

The tank 20 elongated (along the tank axis J) in the lateral direction and the electric motor 11 with the motor axis M extending in the lateral direction are located in a lower portion of the air compressor 1. The electric motor 11 and the tank 20 are adjacent to each other in the front-rear direction in the lower portion. The tank 20 and the electric motor 11, which occupy a relatively large space, are adjacent to each other in the front-rear direction in the lower portion of the air compressor 1 in a space efficient manner. In addition, the tank 20 and the electric motor 11, which are relatively heavy objects, are located in the lower portion, allowing stable placement of the air compressor 1.

The cylinder 15 in the compression unit 10 extends vertically. The piston 14 reciprocates in the vertical direction. The electric motor 11 is located laterally, adjacent to the side surface of the cylinder 15 extending vertically, with the motor axis M extending in the lateral direction. The battery mount 45 is located above the electric motor 11. The electric motor 11 and the battery mount 45 are thus efficiently arranged with respect to the cylinder 15 extending vertically.

The battery mount 45 is located to receive the battery pack 40 with its front located above the tank 20. The mount space for the battery pack 40 thus overlaps the tank 20 in the front-rear direction (in the direction parallel to the placement surface F), saving space.

The tank 20 elongated in the lateral direction is located in a front portion of the air compressor 1. The right and left frames 51 and 52 of the guard 50 each are arranged in a loop as viewed laterally, extending upward from the front portion of the tank 20, then rearward, and downward. The air compressor 1, including the compression unit 10, the operation unit 30, and the battery pack 40, is substantially entirely contained within the protective area G defined by the loop as viewed laterally and is thus protected.

The lid 17 for filter replacement protrudes from the compression unit cover 19. This allows the lid 17 to be reliably rotated. The user can easily rotate the lid 17 for detachment and reattachment without being obstructed by the compression unit cover 19 and without accidentally touching a heating portion of the compression unit 10. This facilitates filter replacement.

The embodiment described above may be modified variously. For example, the lid 17 for filter replacement may be located within the protective area G inside the guard 50. The adjustment dial 32 in the operation unit 30 protrudes upward between the front inclines 51e and 52e of the guard 50 in the illustrated structure. However, the adjustment dial 32 may be within the protective area G with front inclines 51e and 52e having a different inclination angle. The front inclines 51e and 52e may be eliminated and the front ends of the upper frames 51b and 52b may be connected to the upper ends of the front frames 51a and 52a at substantially right angles.

In the illustrated embodiment, the openings PR, PU, and PB are at three positions, or rightward, upward, and rearward from the battery pack 40. However, instead of or in addition to this structure, the openings may be located frontward or leftward.

Multiple battery packs 40 may be attachable within the protective area G. The right and left ends of the tank 20 may be within the protective area G.

REFERENCE SIGNS LIST 1 air compressor
F placement surface
10 compression unit
11 electric motor
M motor axis
11a motor housing
12 belt transmission
13 piston rod
14 piston
15 cylinder
16 filter
16a compartment
17 lid
18 intake pipe
19 compression unit cover
19a heat vent
19b outlet
19c inlet
19d front portion
19e tubing
20 tank
J tank axis J (elongated direction)
21 leg
22 drain
22a open-close cock
30 operation unit
31 operation unit case
32 adjustment dial
33 pressure gauge
34 activation switch
35 connection port
H air hose
T air tool
36 relief valve
40 battery pack
40R right face
40U upper face
40B rear face
41 attachment face
41a rail
41b (positive) terminal receiver
41c (negative) terminal receiver
42 lock tab
43 unlock button
45 battery mount
45a rail receiver
45b positive terminal
45c negative terminal
46 lock recess
50 guard
51 right frame
51a front frame
51b upper frame
51c rear frame
51d lower frame
51e front incline
52 left frame
52a front frame 52b upper frame
52c rear frame
52d lower frame
52e front incline
53 connecting frame
54 handle
55 connecting frame
G protective area
GL front-rear area
GW lateral area
GH vertical area
PR opening (rightward)
PU opening (upward)
PB opening (rearward)

What is claimed is:

1. An air compressor, comprising: an electric motor; a battery pack (i) having six faces and (ii) configured to drive the electric motor; an operation unit (i) having an operation panel and an activation switch and (ii) configured to connect and disconnect power to the electric motor by operation of the activation switch; a compression unit (i) having a cylinder and (ii) a piston that is configured to be driven by the electric motor in the cylinder to produce compressed air; a tank configured to store the compressed air; a battery mount configured to receive an attachment face of the six faces of the battery pack; and a guard defining a protective area that contains the battery pack and the compression unit, wherein: the battery pack is attachable to the battery mount with at least three of the six faces exposed; the battery mount is adjacent to the cylinder and directly above the electric motor; and at least a portion of the battery pack is directly above the tank when the battery pack is attached to the battery mount.

2. The air compressor according to claim 1, further comprising:
a compression unit cover covering the compression unit, wherein the battery mount is on an upper surface of the compression unit cover.

3. The air compressor according to claim 1, wherein the tank has a tank axis in a lateral direction,
the electric motor has a motor axis in the lateral direction, and
the electric motor and the tank are adjacent to each other in a front-rear direction in a lower portion of the air compressor.

4. The air compressor according to claim 1, wherein the tank is in front of the electric motor, and
the guard includes
a front frame extending upward from a front portion of the tank,
an upper frame extending rearward from an upper end of the front frame,
a rear frame extending downward from a rear end of the upper frame, and
a lower frame extending frontward from a lower end of the rear frame and connected to a lower surface of the tank.

5. The air compressor according to claim 1, wherein the guard includes
a right frame in a right portion of the air compressor,
a left frame in a left portion of the air compressor,
a connecting frame extending in a lateral direction and connecting the right frame and the left frame, and
a handle on the connecting frame.

6. The air compressor according to claim 1, further comprising:
a compression unit cover covering the compression unit;
a filter included in the compression unit to filter air; and
a lid protruding from the compression unit cover and detachable from the compression unit.

7. The air compressor according to claim 2, wherein the tank has a tank axis in a lateral direction,
the electric motor has a motor axis in the lateral direction, and
the electric motor and the tank are adjacent to each other in a front-rear direction in a lower portion of the air compressor.

8. The air compressor according to claim 2, wherein the tank is in front of the electric motor, and
the guard includes
a front frame extending upward from a front portion of the tank,
an upper frame extending rearward from an upper end of the front frame,
a rear frame extending downward from a rear end of the upper frame, and
a lower frame extending frontward from a lower end of the rear frame and connected to a lower surface of the tank.

9. The air compressor according to claim 3, wherein the tank is in front of the electric motor, and
the guard includes
a front frame extending upward from a front portion of the tank,
an upper frame extending rearward from an upper end of the front frame,
a rear frame extending downward from a rear end of the upper frame, and
a lower frame extending frontward from a lower end of the rear frame and connected to a lower surface of the tank.

10. The air compressor according to claim 2, wherein the guard includes
a right frame in a right portion of the air compressor,
a left frame in a left portion of the air compressor,
a connecting frame extending in a lateral direction and connecting the right frame and the left frame, and
a handle on the connecting frame.

11. The air compressor according to claim 3, wherein the guard includes
a right frame in a right portion of the air compressor,
a left frame in a left portion of the air compressor,
a connecting frame extending in a lateral direction and connecting the right frame and the left frame, and
a handle on the connecting frame.

* * * * *